US009843443B2

(12) United States Patent
Ben Saied et al.

(10) Patent No.: US 9,843,443 B2
(45) Date of Patent: Dec. 12, 2017

(54) DEVICE AND METHOD FOR GENERATING A SESSION KEY

(71) Applicant: COMMISSARIAT A L'ENERGIE ATOMIQUE ET AUX ENERGIES ALTERNATIVES, Paris (FR)

(72) Inventors: Yosra Ben Saied, El Mida Nabeul (TN); Alexis Olivereau, Orsay (FR); Christophe Janneteau, Chaudon (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 423 days.

(21) Appl. No.: 14/409,936

(22) PCT Filed: Jun. 19, 2013

(86) PCT No.: PCT/EP2013/062784
§ 371 (c)(1),
(2) Date: Dec. 19, 2014

(87) PCT Pub. No.: WO2013/190003
PCT Pub. Date: Dec. 27, 2013

(65) Prior Publication Data
US 2015/0188700 A1  Jul. 2, 2015

(30) Foreign Application Priority Data

Jun. 21, 2012 (FR) ...................... 12 55856

(51) Int. Cl.
*H04L 29/06* (2006.01)
*H04L 9/08* (2006.01)

(52) U.S. Cl.
CPC ............ *H04L 9/0841* (2013.01); *H04L 9/085* (2013.01); *H04L 9/0838* (2013.01); *H04L 2209/24* (2013.01); *H04L 2209/76* (2013.01)

(58) Field of Classification Search
CPC ..... H04L 9/0841; H04L 9/0838; H04L 9/085; H04L 2209/24; H04L 2209/76
See application file for complete search history.

(56) References Cited

U.S. PATENT DOCUMENTS 5,046,094 A * 9/1991 Kawamura ............. G06F 7/723
380/277
6,779,111 B1 * 8/2004 Gehrmann ............. H04L 9/302
380/259

(Continued)

OTHER PUBLICATIONS

D-HIP: A distributed key exchange scheme for Hip-based Internet of Things; Saied, Yosra Ben; Olivereau, Alexis. 2012 IEEE International Symposium on a World of Wireless, Mobile & Multimedia Networks (WoWMoM), Jan. 1, 2012, p. 1-7, 7p. Publisher: IEEE.*

(Continued)

*Primary Examiner* — Anthony Brown
*Assistant Examiner* — William Corum, Jr.
(74) *Attorney, Agent, or Firm* — Baker Hostetler LLP

(57) ABSTRACT

A device and method are provided for establishing a session key between two entities of a communication network that may be highly heterogeneous in terms of resources. The method, based on the Diffie-Hellman (DH) algorithm, provides for the delegation to assistant nodes of the network of the cryptographic operations required for the computations of the DH public value and of the DH session key for the node which is constrained in terms of resources.

18 Claims, 5 Drawing Sheets

(56) References Cited

U.S. PATENT DOCUMENTS

| | | | | |
|---|---|---|---|---|
| 7,382,875 | B2* | 6/2008 | Girault | H04L 9/302 380/28 |
| 7,668,310 | B2* | 2/2010 | Kocher | G06F 21/556 380/28 |
| 8,050,409 | B2* | 11/2011 | Agrawal | H04L 9/083 380/278 |
| 2003/0081785 | A1* | 5/2003 | Boneh | H04L 9/0847 380/277 |
| 2008/0019512 | A1 | 1/2008 | Gueron et al. | |
| 2015/0067329 | A1* | 3/2015 | Ben Saied | H04L 9/0838 713/168 |

OTHER PUBLICATIONS

HIP Tiny Exchange (TEX): A distributed key exchange scheme for HIP-based Internet of Things Conference; Ben Saied, Yosra; Olivereau, Alexis. Third International Conference on Communications & Networking , Jan. 1, 2012, p. 1-8, 8p. Publisher: IEEE.*

Yvo Desmedt, et al., "Shared Generation of Authenticators and Signatures", Advances in Cryptology, Apr. 16, 1992, pp. 457-469, Springer, Berlin, Germany, XP00269043.

Tsutomu Matsumoto, et al., "Speeding Up Secret Computations with Insecure Auxiliary Devices", Advances in Cryptology, Jan. 1, 1988, pp.. 497-506, Springer, Bering, Germany, XP000345652.

Yosra Ben Saied, et al., "Energy Efficiency in M2M Networks: A Cooperative Key Establishment System", 2011 3rd International Congress on Ultra Modern Telecommunications and Control Systems and Workshops, Oct. 5, 2011, pp. 1-8, XP032021400.

Whitfield Diffie, et al, "New Directions in Cryptography", IEEE Transactions on Information Theory, Nov. 1976, pp. 644-654, vol. 22, No. 6.

Elaine Barker, et al., "Recommendation for Pair-Wise Key establishment Schemes Using Discrete Logarithm Cryptography—Computer Security", NIST, Special Publication 800-56A, Mar. 2006, pp. 1-138.

Nachiketh R. Potlapally, et al., "A Study of the Energy Consumption Characteristics of Cryptographic Algorithms and Security Protocols", IEEE Transactions on Mobile Computing, Feb. 2006, pp. 128-143, vol. 5, No. 2.

S. Kent, et al., "Security Architecture for the Internet Protocol", RFC 4301, Dec. 2005, pp. 1-101.

A Freier, et al., "The Secure Sockets Layer (SSL) Protocol Version 3.0", RFC 6101, Aug. 2011, pp. 1-67.

* cited by examiner

US 9,843,443 B2

DEVICE AND METHOD FOR GENERATING A SESSION KEY

CROSS-REFERENCE TO RELATED APPLICATIONS

This application is a National Stage of International patent application PCT/EP2013/062784, filed on Jun. 19, 2013, which claims priority to foreign French patent application No. FR 1255856, filed on Jun. 21, 2012, the disclosures of which are incorporated by reference in their entirety.

FIELD OF THE INVENTION

The invention relates to the field of security in communication networks and in particular the establishment of session between nodes in networks with low resources.

PRIOR ART

The Diffie-Hellman (DH) key exchange is a method that allows the establishment of a key or DH session key between two entities, to be used for enciphering or authenticating their communications. The Diffie-Hellman (DH) algorithm described in [W. Diffie and M. E. Hellman, New directions in cryptography, IEEE transactions on information theory, 22(1976), 644-654] which is implemented between two entities A and B, supposes that the latter have first agreed on two parameters g and p. The entities A and B then randomly generate secret values (a and b), and compute the corresponding public values $g^a$ mod p and $g^b$ mod p. The entities A and B then exchange their respective public values. Each entity is then able to compute an identical session key: A by raising the secret value received from B to the power a (modulo p) and B by raising the secret value received from A to the power b (modulo p) according to the equations:

$$(g^b \bmod p)^a \bmod p = (g^a \bmod p)^b \bmod p = g^{ab} \bmod p.$$

Two modular exponentiations are thus required for A and B alike: the first makes it possible to generate the public value from the private value, and the second to obtain the session key from the public value of the opposite party. These modular exponentiation operations are particularly expensive in terms of resources.

The Elliptic Curve Diffie-Hellman (ECDH) as described in [NIST, Special Publication 800-56A, Recommendation for Pair-Wise Key Establishment Schemes Using Discrete Logarithm Cryptography, March 2006] specifies a variant of the Diffie-Hellman algorithm that relies on elliptic-curve cryptography. The computations of the public value and the session key are made easier because the modular exponentiations of the conventional DH algorithm are replaced by multiplications of points as provided for in elliptic-curve cryptography. Thus, the entities A and B of a session choose private values, $d_A$ and $d_B$ respectively, and obtain their public values $Q_A = d_A G$ and $Q_B = d_B G$. These public values are then exchanged between A and B. A obtains the session key as $k_{ECDH} = d_A Q_B$ and B as $k_{ECDH} = d_B Q_A$, and these two keys are equal to $d_A d_B G$. Elliptic-curve cryptography, although less demanding in resource terms than 'conventional' cryptography based on modular exponentiations, remains costly in terms of energy, in the order of 50% of the cost of conventional cryptographic operations as detailed in [N. R. Potlapally, S. Ravi, A. Raghunathan, N. K. Jha, "A study of the energy consumption characteristics of cryptographic algorithms and security protocols," IEEE Transactions on Mobile Computing 5 (2) (2006) 128-143].

In a network environment where entities (also called nodes) are heterogeneous and can have resource constraints of different orders, the DH exchange on highly constrained nodes can quickly use up their resources and reduce their network lifetime. In the contexts of 'machine-to-machine' (M2M) or the Internet of Things (IoT), a sensor with limited resources that is considered to be part of the Internet can be made to communicate directly with nodes that do not belong to the same M2M or IoT topology and that are not subject to resource constraints. These limited capacity sensors can quickly disappear from the network due to their resources being used up, following the implementation of instances of complex algorithms, such as the Diffie-Hellman algorithm.

The patent US 2008/0019512 A1 describes a solution wherein a less resource-intensive variant of the Diffie-Hellman protocol, designed for nodes with resource constraints such as smart cards or mobile phones, is specified. This solution proposes to use exponents (secret DH values) chosen in such a way as to incur fewer costs during the modular exponentiation computations. To do this, the types of possible exponents are restricted and they are chosen in such a way that the corresponding exponentiation incurs few multiplications and many squarings. However, this solution reduces the number of possible values that the private Diffie-Hellman value can take, which thereby loses its random nature and becomes less difficult for an attacker to guess. The performance gain is therefore achieved at the expense of the level of security obtained.

The existing problem lies in the complexity of the Diffie-Hellman protocol, which makes its energy cost very high. Because of this its use can be made impossible for environments comprising highly constrained nodes. In addition, nodes implementing it repeatedly can use up the entirety of their energy resources in an excessively short time, thus ending up prematurely disconnected from the network.

However, the Diffie-Hellman protocol is specified as an essential cryptographic primitive in security protocols currently in use. Thus, the protocols IPsec [Kent, S. & Seo, K., Security Architecture for the Internet Protocol (rfc4301), IETF, 2005] and SSL [Freier, A., Karlton, P., and P. Kocher, "The Secure Sockets Layer (SSL) Protocol Version 3.0", RFC 6101, August 2011.], which make up the very great majority of techniques used to secure communications, both rely on the Diffie-Hellman algorithm to agree on the session keys to be used in the secure tunnels they establish. Furthermore, many Diffie-Hellman exchanges are liable to be required for one and the same node, since a DH exchange is necessary from the moment that a secure connection with a new partner has to be established.

The need therefore exists for a solution with low energy consumption that allows the use of the Diffie-Hellman protocol to establish session keys, while maintaining a high level of communication security.

The present invention meets this need.

SUMMARY OF THE INVENTION

One object of the present invention is to provide a method for establishing a session key between two entities that may be highly heterogeneous in terms of resources.

Advantageously, the method of the invention based on the Diffie-Hellman (DH) algorithm provides for the delegation to assistant nodes of the cryptographic operations required for the computations of the DH public value and of the DH session key for the node which is constrained in terms of resources.

Advantageously, the present invention provides for a collaboration between nodes to make the nodes in the neighborhood of a constrained node carry out the most costly operations of the DH algorithm, without compromising the confidentiality of the private value of the constrained node.

Advantageously, the present invention meets both the requirements for security and low operating cost. Indeed, the delegation of the cryptographic computations is carried out in such a way that the confidentiality of the private value of the node with low resources is ensured with regard to the assistant nodes.

Another subject of the present invention is the enabling, in a communication network, of an increase in the lifetime of nodes which are highly constrained in terms of resources.

Advantageously, the invention makes use of the heterogeneity of the nodes of a network to unburden the nodes with low resources from the costly exponential computation necessary to generate the DH keys.

Still advantageously but without being limiting, the invention is applicable in the industrial fields of stack editors of network protocols for objects with low resources participating in an integrated Internet of Things model.

Advantageously, the assistant nodes provided in the solution can be marketed as entities joining onto an existing "sensor network" infrastructure.

To obtain the desired results, a method as described in independent claim 1, a device as described in independent claim 14 and a computer program product as described in claim 15 are provided.

In particular, in a communication network comprising a plurality of communicating entities, a method for establishing a session key according to the Diffie-Hellman protocol between a source entity and a target entity is proposed, the method comprising a step of generation of a source private value 'a' for the source entity and of a target private value 'b' for the target entity, a step of computation of corresponding source '$g^a$ mod p' and target '$g^b$ mod p' public values, the method being characterized in that the step of computation of the source public value comprises a step of computing fragments of source public value, the fragments of source public value being computed for fragments of the source private value by assistant entities among the plurality of communicating entities.

Various variant implementations are described in the dependent claims.

DESCRIPTION OF THE FIGURES

Various aspects and advantages of the invention will appear, supported by the description of a preferred but non-limiting mode of implementation of the invention, with reference to the figures hereinbelow.

DETAILED DESCRIPTION OF THE INVENTION

The present invention describes a session key exchange, based on the Diffie-Hellman protocol, between two entities that are heterogeneous in terms of resources. The solution employs distributed collaborative techniques using assistant nodes or proxies.

Figure 1:
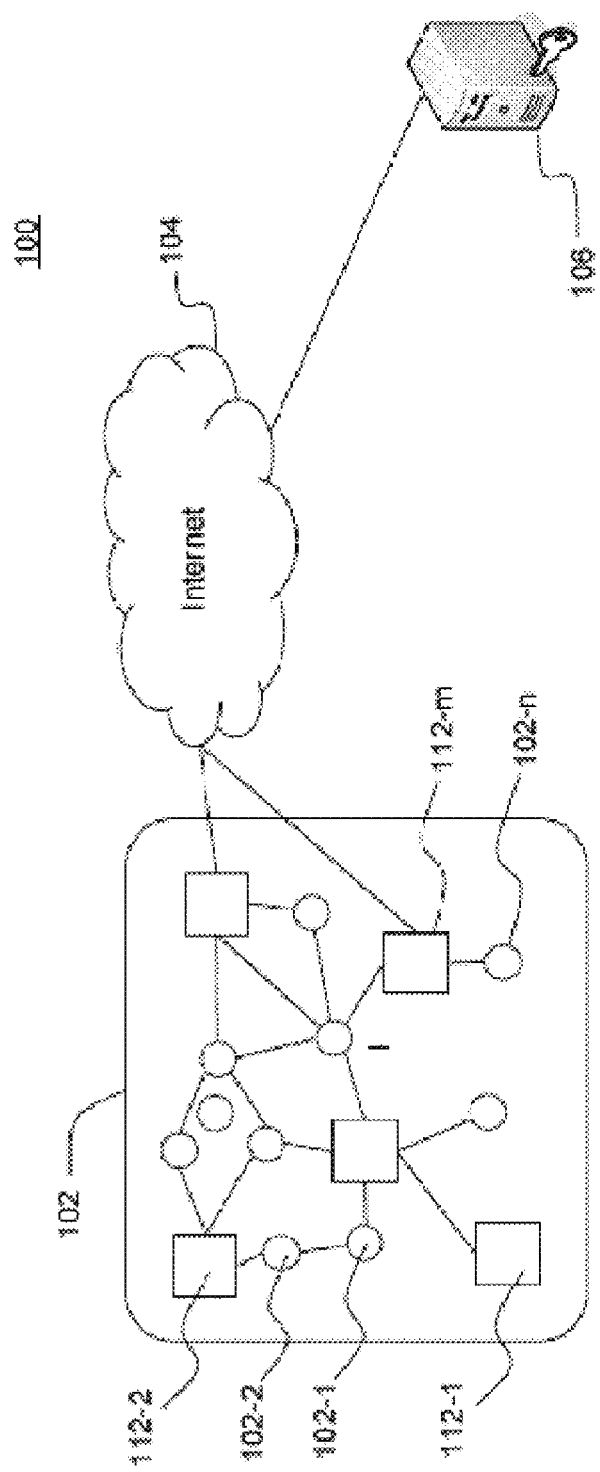
FIG. 1 is a topological representation of a network infrastructure wherein the invention may be advantageously implemented.

FIG. 1 illustrates a network environment (100) wherein the invention is advantageously implemented. For reasons of ease of description and not of limitation of the invention, the example in FIG. 1 shows only a finite number of entities and connections, but those skilled in the art will be able to extend the principles described to a plurality and a variety of entities and connection types (wireless, mobile, very high speed).

The network (100) comprises a set of fixed or mobile entities forming a network of nodes (102). The network of nodes comprises nodes with heavy resource constraints (102-1, 102-n) and nodes with lesser resource constraints (112-1, 112-m).

The nodes with heavy resource constraints can be wireless actuators or sensors, with limited computation and/or storage capabilities. These can also be active tags. However, a node that is not intrinsically limited in resources can become so temporarily as soon as it uses a large part of its processor resources for another task, or as soon as its battery level reaches a critical threshold value. And this node can be compelled to implement less energy-expensive protocols, such as that of the invention.

The nodes with lesser constraints in terms of resources can be portable phones equipped with an Internet connection and a camera. They can also be interconnection gateways between a network of constrained entities and the Internet. These entities offer greater computational power and storage capacity, can possess a larger energy reserve (battery, mains power) and can communicate over a network, either directly to an Internet network (104) as illustrated or else via intermediate gateways and servers (not shown).

The network of nodes (102) can be based on level 2 communications (for example, 802.15.4 or 802.11) or level 3 communications (for example, IP) between the nodes forming it. According to the protocols on which it is based, multicast or broadcast communication schemes may be used therein.

The network (100) also comprises remote entities (106) not having any resource constraints, by comparison with those of the network of nodes (102).

The remote entities can be servers (for example, server for the storage and/or management of information uploaded by one or more sensors or an actuator control server) having large storage capacities and computational power or any other entity having unconstrained computational, storage and energy capacities.

Such a network (100) forms what is known as an Internet of Things (IoT). It covers two types of communication:
Thing-to-person types;
Thing-to-thing, or machine-to-machine (M2M) types.
These communications can be established in a limited context (use of a single protocol, for example ZigBee and/or a single target scenario, for example the Smart Grid) in which case the term "Intranet of Things" is used, or can be designed to make possible a large number of separate services, while being based on many communications protocols, in which case the term "Internet of Things" is used. Generally, the term Internet of Things refers to an architecture that allows the interconnection of the conventional Internet with communicating or perceived things, and which is based on decentralized communication schemes, while employing autonomous mechanisms.

The present invention can be advantageously applied in the environment in FIG. 1 between a node which is highly constrained in terms of resources (102-1) that is named interchangeably source or sender entity in the present description, and a powerful remote server (106) that is named target or receiver entity. The two entities need to establish a session key.

Figure 2:
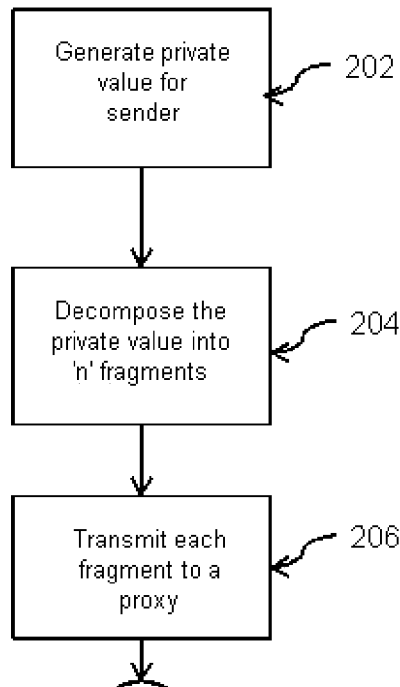
FIG. 2 shows the steps taken by a source entity to decompose a private value into fragments of secret values.

FIG. 2 shows the procedures executed by a source entity to decompose a source private value into a set of secret values to be addressed to assistant entities.

In a first step 202, the source entity randomly generates a source private value 'a' according to the principle of the Diffie-Hellman protocol, where this value corresponds to the secret exponent that is used to deduce the Diffie-Hellman public value.

The source private value is decomposed in the next step 204 into a plurality 'n' of secret values '$a_i$'. In this phase, the source entity generates a set of values '$a_i$', the possession of all or a certain number of which makes it possible to reconstitute its secret exponent 'a'.

The number of fragments 'n' corresponds to the number of assistant entities or proxies that are selected to support the key exchange between the source and target entities.

The selection of the proxies can be based on the reputations of the entities present in the neighborhood of the source entity and/or their available resources such as for example their computational power or their battery level. In the case where the selection is based on the reputations of the nodes in the neighborhood, they can be evaluated locally or by a central server according to their past attitudes. A metric, the reputation, is then defined which accounts for the types and proportions of attitudes, positive (for example, offering a service) and negative (for example, refusing to offer a service) that a node has manifested in the past. In a variant, the source entity can keep a predefined list of usable proxies, and the selection of the proxies to be used for the session is made from this list.

In the following step 206, each secret value $a_i$ is assigned and transmitted to a proxy $P_i$ among the 'n' selected proxies.

Figure 3:
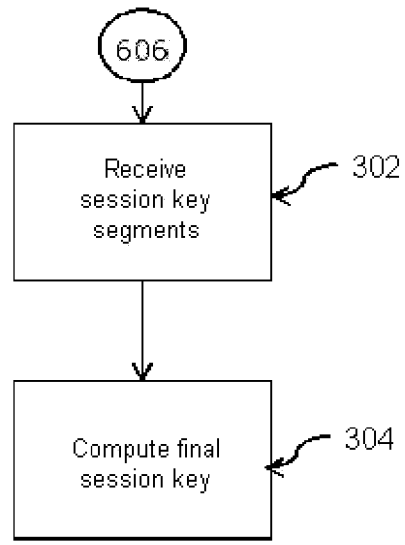
FIG. 3 shows the steps taken by a source entity to compute a session key.

FIG. 3 shows the steps taken by a source entity to compute a final session key. In a step 302, the source entity receives an encrypted value from each of the 'n' proxies. Each value corresponds to the result of an exponentiation carried out by each proxy respectively. In the step 304 the source entity computes the value of the final DH key on receiving all the encrypted values.

Figure 4:
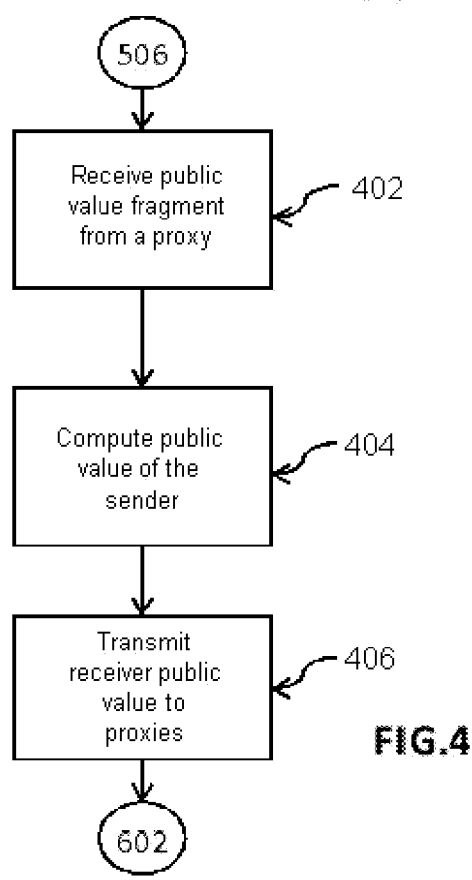
FIG. 4 shows the steps taken by a target entity to compute a public value of the source entity.

FIG. 4 shows the steps taken by a target entity to compute a public value of the source entity. In the step 402, the target entity receives from 'n' proxies a set of 'n' public values. Each value corresponds to the computation of a public value carried out respectively by each proxy on the basis of the fragment of secret value received from the source entity. According to the variant implementations that are described below, with reference to FIGS. 7 and 8, on reception either of all the public values or of a finite number of them, the target entity computes in the step 404 the public value $g^a$ mod p of the source entity. In the following step 406, the target entity transmits to the 'n' proxies a public value that is, in the variant implementation of FIG. 7 or 8, either its own public value $g^b$ mod p for the variant in FIG. 7 or a fragment of its public value as will be detailed below with reference to FIG. 8.

Figure 5:
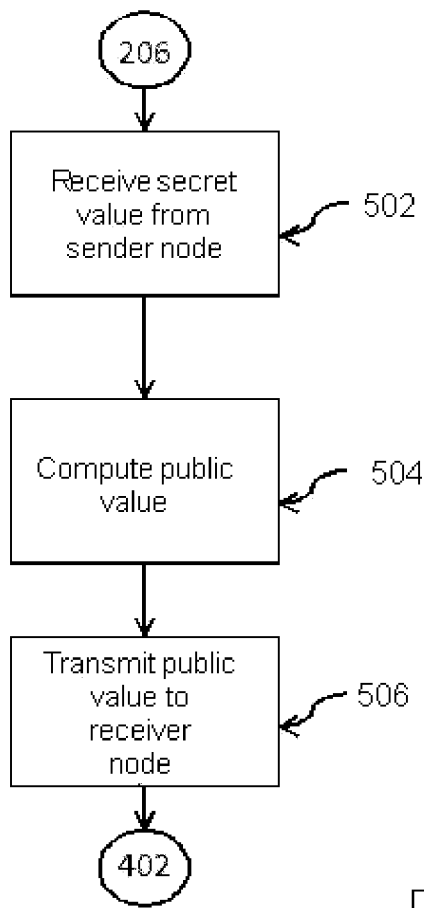
FIG. 5 shows the steps taken by a proxy to compute a fragment of public value.

FIG. 5 shows the steps taken by an assistant entity to compute a public value corresponding to the fragment of the secret value received from the source entity. In the step 502, a proxy $P_i$ receives from the source entity a secret value resulting from the decomposition of the initial private value 'a'. In the following step 504, the proxy $P_i$ computes the public value for the fragment of the received secret value, generating a fragment of public value. The fragment of public value is transmitted to the target entity in the step 506.

Figure 6:
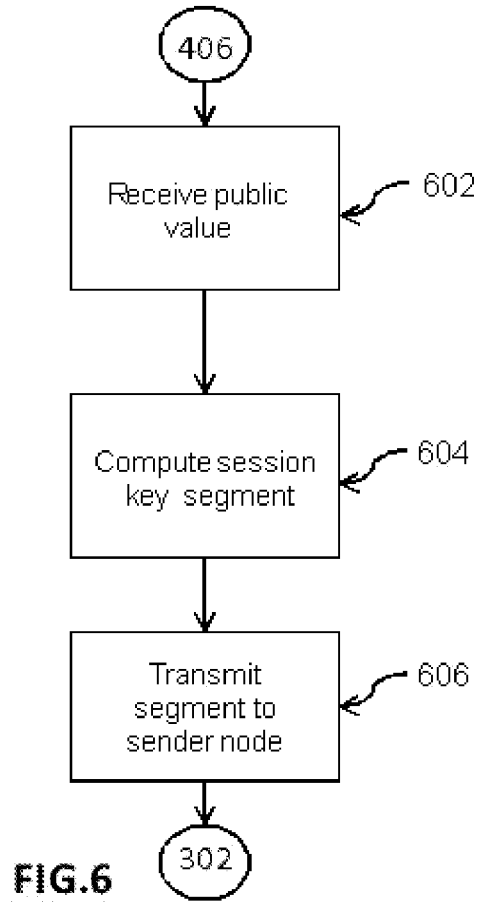
FIG. 6 shows the steps taken by a proxy to compute a segment of a session key.

FIG. 6 shows the steps taken by an assistant entity to compute a segment of a DH session key. In an initial step (not shown), the target entity randomly generates a target private value 'b' according to the principle of the Diffie-Hellman protocol, where this value corresponds to the secret exponent that is used to deduce its Diffie-Hellman public value. In the step 602, a proxy $P_i$ receives a public value computed by the target entity from its own public value $g^b$ mod p as described with reference to FIG. 4. In the following step 604, the proxy computes a final session key segment from the fragment of the secret value previously received by the source entity (step 206) and the public value received from the target entity. Then in the step 606, the proxy sends the generated session key segment to the source entity.

Figure 7:
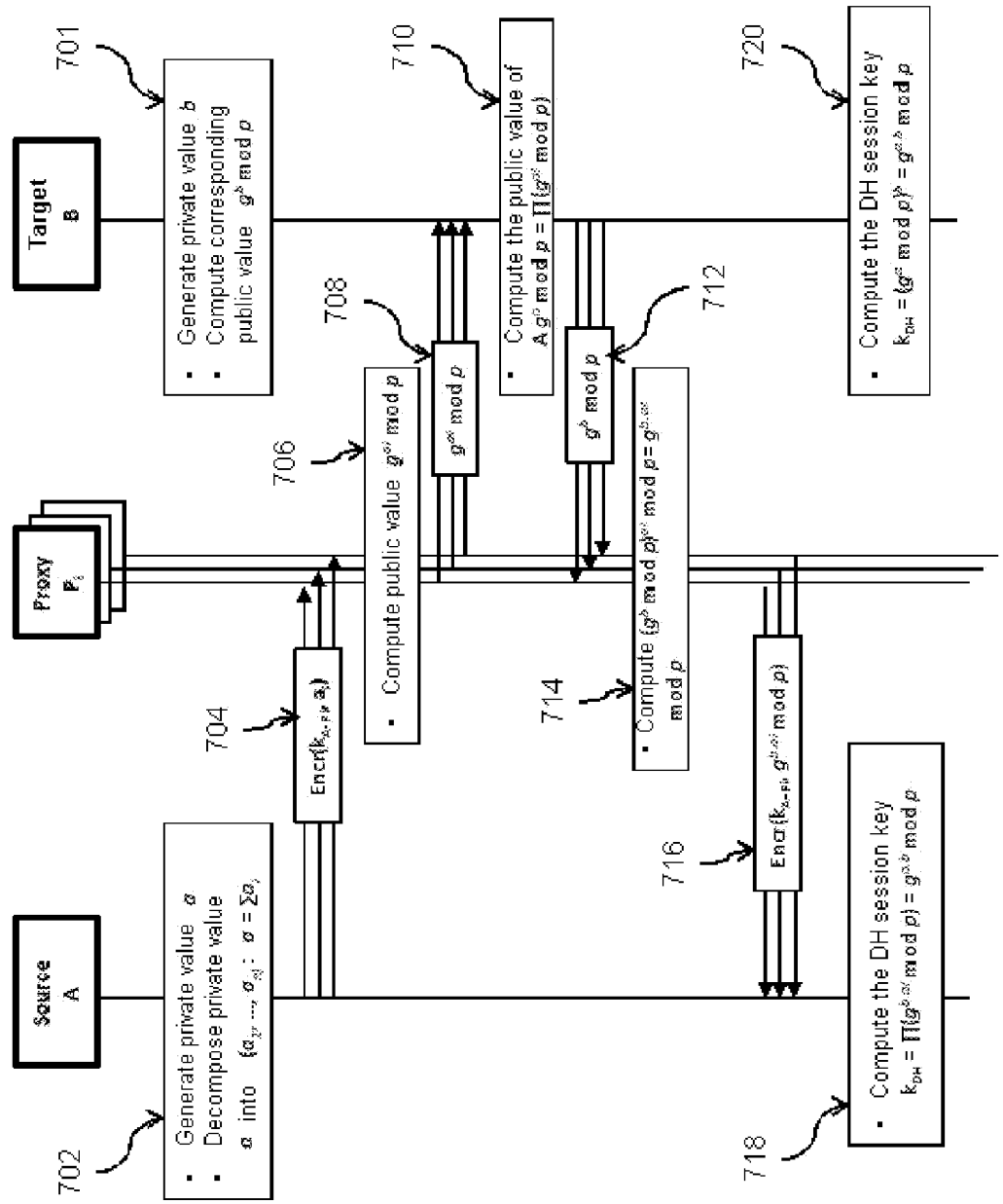
FIG. 7 shows the exchanges performed between a source node and a target node to establish a session key in a first variant implementation of the invention.
Figure 8:
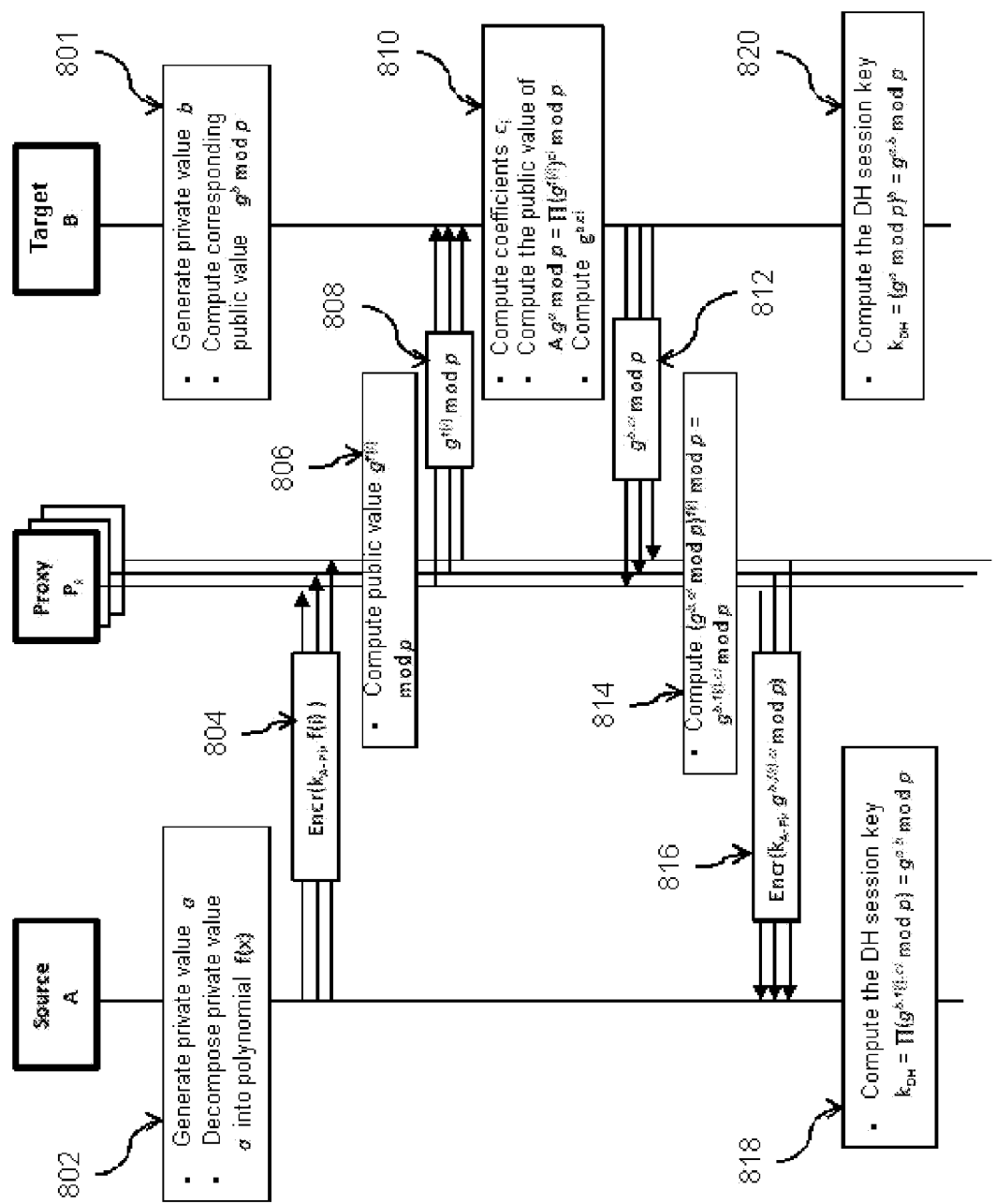
FIG. 8 shows the exchanges performed between a source node and a target node to establish a session key in a second variant implementation of the invention.

FIGS. 7 and 8 show the exchanges performed between a source entity (or node 'A') and a target entity (or node 'B') to establish a session key in two variant implementations of the invention.

In a phase not shown in the figure, the node A selects assistant nodes $P_i$ with fewer resource constraints than itself to participate in the exchange.

In a first phase (701, 801) the node B generates a random number 'b' as secret exponent to compute its DH public value, from the two parameters 'g' and 'p' on which the source and target entities have agreed.

Then, in the next phase (702, 802) the node A generates a random number 'a' as DH secret exponent.

In the example described, it is supposed that the source is low in resources and that the cryptographic operations required for the computations of its DH public value and its DH session key are delegated to the assistant nodes Proxies ($P_1, \ldots, P_n$).

Note that the secret exponent 'a' must be kept private at the node A and cannot be decrypted again in the node B or in the proxies.

In a first variant (FIG. 7), the node A generates a set of 'n' values from the secret exponent 'a'. Advantageously, the node A decomposes its secret exponent 'a' into n fragments ($a_1, \ldots, a_n$), n being the number of proxies selected to support the exchange, and such that $a=\Sigma_1^n a_i$.

The node A then securely provides (704) to each proxy $P_i$ the fragment that is assigned to it, using a security association based on a symmetrical key $k_{A-P_i}$ between A and $P_i$.

A second variant (FIG. 8) is based on the Lagrange polynomial interpolation technique. Considering k points in a 2-dimensional plane ($x_i, y_i$), . . . , ($x_k, y_k$) (with the $x_i$ pair-wise distinct), a unique polynomial f(x) of degree k−1 exists satisfying $f(x_i)=y_i$ for all values of i. The polynomial f is derived using the following Lagrange formula:

$$f(x) = \sum_{i=1}^{k}\left(f(i) \times \prod_{j \neq i}^{k} \frac{x-j}{i-j}\right)$$

Given this interpolation technique, the node A generates a polynomial f(x) of degree k−1 in the form of $f(x)=q_0+q_1 x+ \ldots +q_{k-1}x_{k-1}$ with $q_1, q_2, \ldots, q_{k-1}$ being random coefficients and $a=q_0$.

From k values of the polynomial f(x), it is possible to find its coefficients and evaluate the secret exponent $a=f(0)$ as follows:

$$a = f(0) = \sum_{i=1}^{k}\left(f(i) \times \prod_{j \neq i}^{k} \frac{-j}{i-j}\right)$$

The node A computes n values $f(1), \ldots, f(n)$ of the polynomial f(x) then securely provides (804) the value f(i) to each proxy $P_i$ with $i=1, 2, \ldots, n$. The knowledge of k values among the n values transmitted to the proxies makes it possible to reconstitute the secret exponent a.

On receiving the secret values from the node A, the proxies carry out an initial computation of the public key of the node A.

In the first variant of the invention, the proxy $P_i$ receives the secret value $a_i$ transmitted by the node A and computes (706) the corresponding public value $g^{a_i}$ mod p.

In the second variant of the invention, the proxy $P_i$ receives the secret value f(i) from the node A and computes (806) the corresponding public value $g^{f(i)}$ mod p.

The proxy $P_i$ then delivers (708, 808) this computed public value to the node B.

On receiving the public values from the proxies, the node B reconstitutes the source public key of the node A which is used to establish the final session key.

It can be appreciated that advantageously, this computation of the source public key is carried out without the secret exponent a of the node A being disclosed to the node B.

In the first variant of the invention, the node B receives (708) the values $g^{a_i}$ mod p from the node A. The reconstitution of the public key of the node A is carried out using the following computation (710):

$$\prod_{i=1}^{n} g^{a_i} \bmod p = g^{\sum_{i=1}^{n} a_i} \bmod p = g^a \bmod p$$

Those skilled in the art will appreciate that the security of the secret 'a' lies in the difficulty of the problem of the discrete logarithm. The node B cannot deduce the a values from the information items $g^{a_i}$ mod p, g and p alone.

In the second variant of the invention, the node B receives (808) the values $g^{f(i)}$ mod p from the node A. The reconstitution of the public key is carried out on receiving a sub-set of k values among the n public values transmitted by the proxies to B.

On receiving these k values $g^{f(i)}$ mod p transmitted by the proxies, the node B computes (810) the coefficients $c_i$ according to the equation:

$$c_i = \prod_{j \in P, j \neq i} \frac{-j}{i-j}$$

Then the node B computes (810) the public key of the node A based on the following Lagrange formula:

$$\prod_{i \in P} (g^{f(i)})^{c_i} \bmod p = g^{\sum_{i \in P} f(i) \times c_i} \bmod p = g^{f(0)} \bmod p = g^a \bmod p$$

Advantageously, the second variant of the invention makes it possible not to enforce the receiving of all the public values, thus protecting the solution from the unavailability or compromising of some of the assistant nodes.

Subsequently, the node B transmits (712, 812) its target public key to the proxies.

In the first variant of the invention, the node B sends (712) to all the proxies $P_i$ its public value $g^b$ mod p.

In the second variant of the invention, the node B computes (810) for each $P_i$ ($i \in P$) the value $g^{bc_i}$ mod p with $c_i$ being the $i^{th}$ coefficient computed in the preceding phase and transmits (812) the result to each proxy $P_i$.

Advantageously, the invention allows for the second exponentiation required for the computation of the session key to be provided by the assistant nodes in a cooperative way.

The selected assistant nodes bear the necessary computational burden to carry out an exponentiation without however being able to generate the final key.

In the first variant, when receiving, each proxy uses the secret $a_i$ initially given by A and the target public value of B to compute (714) $g^{ba_i}$ mod $p = (g^b$ mod $p)^{a_i}$.

In the second variant, when receiving, each proxy uses the value of the polynomial f(i) and the target public value received from B $g^{bc_i}$ mod p to compute (814) $g^{bf(i)c_i}$ mod $p = (g^{bc_i}$ mod $p)^{f(i)}$ mod p.

In the two variants of the invention, these values computed by the proxies are then transmitted (716, 816) securely from each proxy to the node A in order to carry out the final computation of the DH session key (718, 720, 818, 820).

This phase ends the key establishment system based on the DH protocol.

At the node B the computing of the key is carried out as in the usual case of a Diffie-Hellman key exchange. The node B computes (720, 820) the session key by raising the public key of the node A to the power of its secret exponent b to obtain $k_{DH}=g^{ab}$ mod p.

At the node A the computation is carried out according to the variant implementation.

In the first variant, on receiving all the $g^{ba_i}$ mod p values from the proxies, the node A computes (718) the final key by multiplying these various values according to the equation:

$$\prod_{i=1}^{n} g^{ba_i} \bmod p = g^{b \sum_{i=1}^{n} a_i} \bmod p = g^{ab} \bmod p$$

In the second variant, on receiving the $g^{bf(i)c_i}$ mod p values from the k proxies, the node A computes (818) the final key by multiplying these various values according to the equation:

$$\prod_{i \in P} g^{bf(i)c_i} \bmod p = g^{b \sum_{i \in P} f(i)c_i} \bmod p = g^{bf(0)} \bmod p = g^{ab} \bmod p$$

By the end of these computing phases, the source and target entities have established a tunnel for secure communication on a DH session key.

Those skilled in the art will appreciate that variations can be introduced to the preferred form of the method that has been described, while keeping to the principles of the invention.

The present invention can be implemented based on hardware and/or software elements. It can be available as a computer program product on a computer-readable medium. The medium can be electronic, magnetic, optical, electromagnetic or be an infra-red broadcasting medium. Such media are, for example, semiconductor memories (Random Access Memory RAM, Read-Only Memory ROM), tapes, magnetic or optical disks or diskettes (Compact Disc-Read Only Memory (CD-ROM), Compact Disc-Read/Write (CD-R/W) and DVD).

The present description thus illustrates a preferred but non-limiting implementation of the invention. An example has been chosen to allow a good understanding of the principles of the invention, and a concrete application, but it is in no way exhaustive and should allow those skilled in the art to introduce modifications and variant implementations while preserving the same principles.

The invention claimed is:

1. In a communication network comprising a plurality of communicating entities, a method for establishing a session key according to the Diffie-Hellman protocol between a source entity with a source private value 'a' and a target entity with a target private value 'b' and a target public value '$g^b$ mod p', the method comprising the steps of:
    selection of 'n' assistant entities among the plurality of communicating entities;
    decomposition of the source private value 'a' into 'n' fragments;
    enciphering of each fragment 'n' of the source private value;
    transmission to each assistant entity of an enciphered fragment among the 'n' enciphered fragments of the source private value, each assistant entity receiving a different enciphered fragment;
    computation by each assistant entity of a fragment of source public value with the received enciphered fragment of the source private value;
    transmission of the computed fragment of source public value to the target entity by each assistant entity;
    computation by the target entity of the source public value with the received fragments of source public value;
    transmission to the 'n' assistant entities of a fragment of the target public value;
computation by each assistant entity with the enciphered fragment of the source private value, of an exponentiation of the received target public value; and
    transmission of each exponentiation to the source entity.

2. The method as claimed in claim 1, wherein the step of decomposition of the source private value 'a' consists in generating 'n' values '$a_i$' such that a $=\Sigma_1^n a_i$.

3. The method as claimed in claim 1, wherein the step of decomposition of the source private value 'a' consists in generating 'n' values 'f(i)' of a polynomial f(x).

4. The method as claimed in claim 3, wherein the step of enciphering consists in a security association based on a key between the source entity and each assistant entity.

5. The method as claimed in claim 4, wherein the step of computing the source public value by the target entity is done on receiving the 'n' fragments of source public values.

6. The method as claimed in claim 1, wherein the step of computing the source public value by the target entity is done on receiving a number 'k' of fragments of source public values, 'k' being less than 'n'.

7. The method as claimed in claim 6, wherein the computation of the source public value is made by a Lagrange polynomial interpretation.

8. The method as claimed in claim 7, also comprising the steps of: enciphering the exponentiations; and transmitting each enciphered exponentiation to the source entity.

9. The method as claimed in claim 8, comprising after the step of transmission of each exponentiation, the step of computing the Diffie-Hellman session key.

10. The method as claimed in claim 9, wherein the 'n' selected entities are less constrained in terms of resources than the source entity.

11. The method as claimed in claim 10, wherein the fragment of the target public value transmitted to all the assistant entities is the target public value '$g^b$ mod p'.

12. In a communication network comprising a plurality of communicating entities, a system for establishing a session key according to a Diffie-Hellman protocol between a source entity and a target entity, the system comprising:
    means for selection of 'n' assistant entities among the plurality of communicating entities:
    means for decomposition of the source private value 'a' into 'n' fragments;
    means for enciphering of each fragment 'n' of the source private value;
    means for transmission to each assistant entity of an enciphered fragment among the 'n' enciphered fragments of the source private value, each assistant entity receiving a different enciphered fragment;
    means for computation by each assistant entity of a fragment of source public value with the received enciphered fragment of the source private value;
    means for transmission of the computed fragment of source public value to the target entity by each assistant entity; computation by the target entity of the source public value with the received fragments of source public value;
    means for transmission to the 'n' assistant entities of a fragment of the target public value;
    means for computation by each assistant entity with the enciphered fragment of the source private value, of an exponentiation of the received target public value; and
    means for transmission of each exponentiation to the source entity.

13. A computer program product, said computer program comprising processor readable non-transitory media code instructions making it possible to carry out the steps of the method as claimed in claim 10, when said program is executed on a computer.

14. The system as claimed in claim 12, wherein the computing the source public value by the target entity is done on receiving a number 'k' of fragments of source public values, 'k' being less than 'n'.

15. The system as claimed in claim 14, wherein the computation of the source public value is made by a Lagrange polynomial interpretation.

16. The system as claimed in claim 15, further comprising: means for enciphering the exponentiations; and means for transmitting each enciphered exponentiation to the source entity.

17. The system as claimed in claim 16, further comprising means for computing the Diffie-Hellman session key after transmission of each exponentiation.

18. The system as claimed in claim 17, wherein the 'n' selected entities are less constrained in terms of resources than the source entity.

* * * * *